United States Patent [19]
Ohara et al.

[11] Patent Number: 5,367,393
[45] Date of Patent: Nov. 22, 1994

[54] ELECTRO-OPTICAL APPARATUS WITH METAL LIGHT SHIELD AND CONDUCTOR BETWEEN COLOR FILTERS

[75] Inventors: Hiroshi Ohara; Hiroshi Watanabe; Kunio Wanikawa, all of Nagano, Japan

[73] Assignee: Seiko Epson Corporation, Tokyo, Japan

[21] Appl. No.: 25,796

[22] Filed: Mar. 3, 1993

[30] Foreign Application Priority Data

Mar. 6, 1992 [JP] Japan .................. 4-049888
Jan. 20, 1993 [JP] Japan .................. 5-007898

[51] Int. Cl.$^5$ .................. G02F 1/1343; G02F 1/1335; G02F 1/1333
[52] U.S. Cl. .......................... 359/67; 359/54; 359/68; 359/74; 359/88
[58] Field of Search ............. 359/67, 68, 74, 54, 359/88

[56] References Cited

U.S. PATENT DOCUMENTS

| | | | |
|---|---|---|---|
| 4,597,637 | 7/1986 | Ohta | 359/68 |
| 4,653,861 | 3/1987 | Kando et al. | 359/102 |
| 4,824,215 | 4/1989 | Joseph et al. | 359/50 |
| 4,844,569 | 7/1989 | Wada et al. | 359/102 |
| 5,045,418 | 9/1991 | Fukuyoshi | 359/68 |
| 5,101,289 | 3/1992 | Takao et al. | 359/68 |
| 5,106,197 | 4/1992 | Ohuchida et al. | 359/83 |
| 5,278,009 | 1/1994 | Iida et al. | 359/68 |
| 5,282,070 | 1/1994 | Nishida et al. | 359/68 |

FOREIGN PATENT DOCUMENTS

| | | |
|---|---|---|
| 0246842 | 11/1987 | European Pat. Off. . |
| 61-198131 | 9/1986 | Japan . |
| 61-233720 | 10/1986 | Japan . |
| 61-260224 | 11/1986 | Japan . |
| 1-273522 | 12/1986 | Japan . |
| 63-273834 | 11/1988 | Japan . |
| 64-519 | 1/1989 | Japan . |
| 1-291214 | 11/1989 | Japan . |

*Primary Examiner*—Anita Pellman Gross
*Attorney, Agent, or Firm*—Oliff & Berridge

[57] ABSTRACT

An electro-optical apparatus having a color filter, and in particular, such an electro-optical apparatus having a high information content, includes a metal layer which serves as both a light shielding layer and as an electrical conductor so that the escape of light between display elements is prevented to improve contrast and also so that the wiring resistance is reduced to reduce rounding of an applied waveform to thereby prevent cross-talk, the apparatus thus being constructed to readily achieve high-image quality. A color filter is disposed on at least one of a pair of transparent substrates which hold therebetween a liquid crystal layer in cooperation with a sealing member. Transparent display electrodes are disposed above the color filter, with a smoothing layer interposed between the electrodes and the color filter. A light shielding layer formed from, e.g., a metal layer formed in a stripe-shaped patter between adjacent columns of color filter elements of the color filter, serves as an electrical conductor and is electrically connected with the transparent display-electrodes via throughholes formed in the color filter and the smoothing layer.

28 Claims, 6 Drawing Sheets

ELECTRO-OPTICAL APPARATUS WITH METAL LIGHT SHIELD AND CONDUCTOR BETWEEN COLOR FILTERS

BACKGROUND OF THE INVENTION

1. Field of the Invention

The present invention relates to an electro-optical apparatus. Specifically, the present invention relates to an electro-optical apparatus having a color filter layer.

2. Description of Related Art

Several proposals have been made regarding methods for forming a color filter as well as materials and methods for forming a smoothing layer or the like and a color filter in electro-optical apparatus, such as, for example, liquid crystal displays. Further, methods for forming transparent electrodes on or above a color filter have been proposed, for example, by Japanese Laid-Open Patents Nos. 61-198131, 61-233720 and 61-260224 (hereinafter collectively referred to as "the first category of related art").

It has also been proposed to provide an electro-optical apparatus having a high information content and capable of displaying high-quality color images by combining the first category of related art with the construction of an electro-optical apparatus proposed by Japanese Laid-Open Patent No. 64-519 and European Patent Application No. 246,842 (the disclosures of which are incorporated herein by reference). Such a device is adapted for high information content display by combining an optical display cell and an optically anisotropic body. However, it is known that when the display content of such an electro-optical apparatus is increased, since time-division driving is used in the apparatus, electrical rounding of the waveform applied to the display portions occurs due to factors such as wiring resistance and the capacitance of the liquid-crystal layer. Such electrical rounding lowers the effective voltage applied to the liquid crystal material, thus deteriorating the level of display performance of the apparatus. In view of this problem, certain methods are proposed, for example, by Japanese Laid-Open Patents Nos. 61-273522, 63-273834 and 1-291214 (hereinafter collectively referred to as "the second category of related art").

When the first category of related art is applied to an electro-optical apparatus for displaying images by using a matrix arrangement of column electrodes and row electrodes, in order to render the apparatus capable of providing a high information content, and with a view to increasing the duty ratio during dynamic driving, transparent display electrodes should be formed on or above the color filter so as to prevent the effective voltage applied across the liquid crystal material from being lowered. However, most color filters and smoothing layers are formed of an organic resin. Accordingly, when, for example, a layer of indium oxide-tin oxide (ITO) is to be formed (i.e., to form the transparent electrodes) on a color filter by a method such as a vacuum deposition method or a sputtering method, in order to prevent the color filter or the smoothing layer from being wrinkled or damaged in other ways, it is not possible to use a substrate temperature (when forming the transparent electrode) as high as that used when electrodes are formed directly on an ordinary glass substrate. As a result, the specific resistivity of the electrodes cannot be lowered beyond approximately $1.5 \times 10^{-4}$ $\Omega$·cm. Thus, the formation of an ITO layer achieves a wiring-resistance reduction only to a limited extent, and does not assure the full reduction in resistance to a desired value.

Japanese Laid-Open Patent No. 63-273834, one of the second category of related art, proposes methods for preventing effective voltage drops by forming transparent electrodes on and below a color filter layer. The pair of transparent electrodes are electrically coupled to each other by a conductor layer. However, the construction provided in Japanese Laid-Open Patent No. 63-273834 has essentially the same limitations discussed above.

The other documents in the second category, that is, Japanese Laid-Open Patents Nos. 61-273522 and 1-291214, propose disposing thin metal wires below transparent display electrodes in such a manner that the wires extend either through inter-pixel gaps of a color filter or insulating layer, so as to improve light-shielding characteristics and processing resistances. However, Japanese Laid-Open Patent No. 1-291214 has insufficient light shielding characteristics because of an opening located between adjacent thin metal films (22) which are formed around the peripheral portions of each island-shaped color filter (16). These thin metal films are connected at the edges of the island-shaped color filter (16) to a transparent display electrode (23) which is formed on the island-shaped color filter (16).

This construction has two problems, namely, low contrast at the display region and instability of orientation. These problems are exceptionally noticeable when using a twisted nematic liquid crystal material having a twist angle between 90° and 360°. These problems exist because of the unevenness of the color surface due to the crevices located between each island-shaped color filter. The depth of these crevices is equal to the color filter layer thickness. There is no description or suggestion in the reference to provide a smoothing layer for addressing these problems.

Japanese Laid-Open Patent No. 61-273522 has the two problems listed above as well as some additional problems. An electric erosion reaction is apt to occur, and the display reliability deteriorate, when an electrolyte such as water contacts a region of the thin metal wires that is in communication with the outside air. This occurs because the signal input reliability is obtained by using a metal lead electrode which has electrochemical activity.

SUMMARY OF THE INVENTION

One object of the present invention is to provide a construction and method for improving the image quality of an electro-optical apparatus having a color filter, particularly, an electro-optical apparatus of the type having a high information content.

In order to achieve the above and other objects, and to overcome the deficiencies noted above, according to the present invention, there is provided an electro-optical apparatus having a pair of transparent substrates cooperating with a sealing member to hold a liquid crystal layer in a gap located between the transparent substrates. A color filter is disposed on at least one of the transparent substrates with transparent display electrodes disposed above the color filter. Usually the color filter includes a plurality of color filter elements arranged in some pattern (e.g., a matrix of columns and rows) on the substrate. A smoothing layer is interposed between the transparent display electrodes and the color filter. The electro-optical apparatus preferably also includes a light shielding layer defined by a metal layer formed in a pattern (e.g., a series of strips) between, e.g., each column of color filter elements. The metal layer also serves as an electrical conductor and is electrically connected with the transparent display electrodes via through-holes formed in the color filter and in the smoothing layer. Preferably, the metal shielding layer is entirely covered by the combination of the smoothing layer and the transparent electrodes so that it is not exposed to the environment.

With the above arrangement of the present invention, since the light shielding metal layer is formed in a pattern between the color filter elements, and the metal layer serves as an electrical conductor which is electrically connected with the transparent display electrodes via through-holes formed in the color filter and the smoothing layer, it is possible to prevent electrical rounding of the driving waveform so as to prevent the risks of contrast reduction and cross-talk.

BRIEF DESCRIPTION OF THE DRAWINGS

The invention will be described in detail with reference to the following drawings in which like reference numerals refer to like elements and wherein.

DETAILED DESCRIPTION OF PREFERRED EMBODIMENTS

Figure 1:
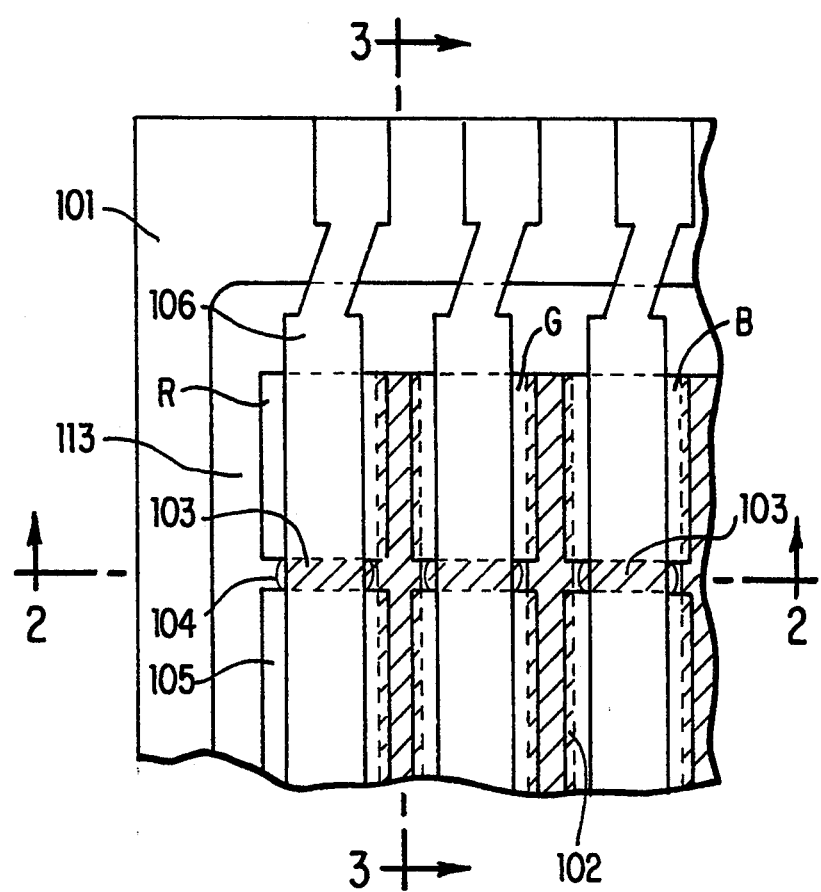
FIG. 1 is a fragmentary plan view of a substrate including a color filter in accordance with a first embodiment of the present invention.

The present invention will now be described in detail with reference to illustrative embodiments thereof. Although the different embodiments have the same basic construction, this is only for the purpose of clarity, and it should be understood that the present invention is not intended to be limited by the particular construction that will be described below. For example, while the described displays have patterns of display elements arranged in columns and rows, other patterns are possible.

An electro-optical apparatus according to the present invention includes a display structure formed on one side of a color filter. The color filter comprises a plurality of columns of color filter elements arranged at a pitch of, e.g., 100 $\mu$m. Transparent display electrodes having, e.g., a width of 75 $\mu$m are formed above the color filter (that is, one electrode strip is located above each column of color filter elements) and arranged at a transparent electrode gap of 25 $\mu$m. When the color filter includes filter elements having three different colors, 640 transparent display electrodes for each of the colors are provided so that there are 1920 electrodes in total. Opposite electrodes are formed on a different substrate located on an opposite side of a liquid crystal material from the substrate containing the color filter, and may have a surface resistivity of 5$\Omega$/□ (where □ is a unit of area such as mm$^2$, cm$^2$, or m$^2$) and a width of 275 $\mu$m, and may be formed of ITO with a film thickness of 2000 Å. 400 such opposite electrodes are arranged at an opposite electrode gap of 25 $\mu$m. The display structure had a wiring resistance of 4 k$\Omega$.

Regarding the alignment treatment, a known method of rubbing a polyimide coating is adopted. However, the present invention is not only applicable to an embodiment where a twisted alignment is produced by alignment treatment but also is applicable to embodiments where an alignment parallel with the substrates (that is, an untwisted alignment) is used and embodiments where a ferroelectric liquid crystal material is used. Thus, the present invention is not intended to be limited to the following examples. Where a twisted alignment is to be produced, the twist angle is not specifically limited. However, the twist angle preferably ranges from 90° to 360°, and is selected based on the requirements of contrast, display characteristics, and production stability. Since the twist angle is not specifically limited, an angle of less than 90° or an angle of more than 360° may be used. In the examples of the present invention, a twist angle of 230° (in the counter-clockwise direction as viewed on the apparatus) is used, and a liquid crystal material layer thickness (hereinafter referred to as "the cell gap size") of 7.0 $\mu$m is used.

In the described embodiments of the present invention, the color filter is of a pigment type because of its superior thermal resistance, and comprises color filter elements having primary colors of red (R), green (G), and blue (B). In order to assure generally required levels of color purity (saturation) and transmittance (brightness), films for each color preferably have a thickness of 1.5 to 2.5 $\mu$m. However, where the method of forming the color filter material does not require a superior thermal resistance, a dye type color filter may be adopted.

Figure 1B:
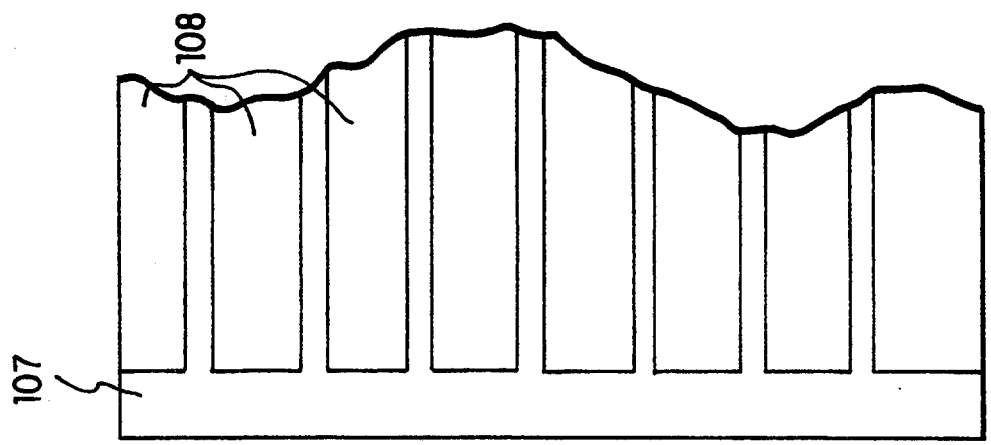
FIGS. 1A and 1B are fragmentary plan views of a substrate containing a color filter and shielding layer and of an opposite substrate containing opposite electrodes.
Figure 1A:
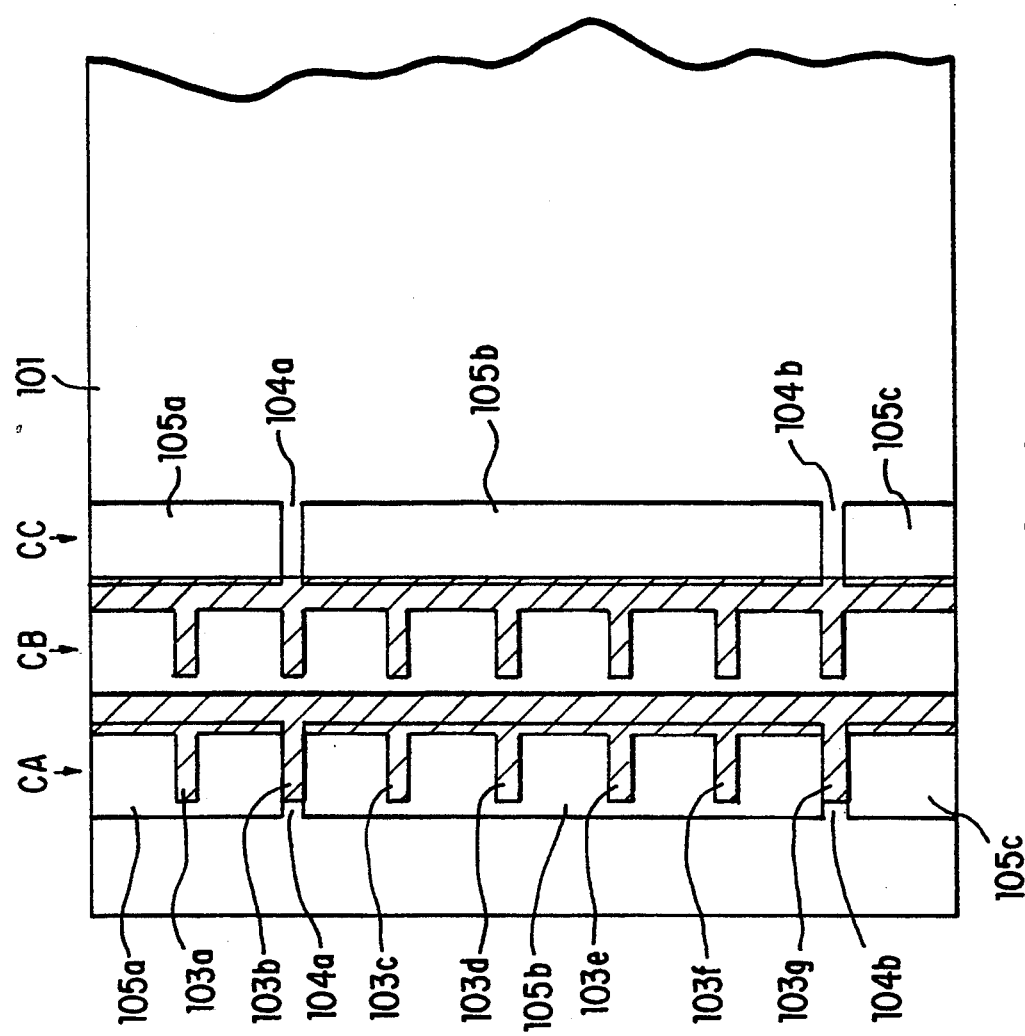

A first embodiment will be described with reference to FIG. 1. A light shielding layer 102 made of a chromium-gold material was formed as part of a display structure on a glass substrate 101 in such a manner that the light shielding layer 102 had a series of parallel line elements (strips), each line having a width of 15 $\mu$m, which were arranged in a striped pattern at positions which would correspond to the intervals between adjacent columns of color filter elements. During this formation, electrical connecting portions 103 of the light shielding layer 102 were also formed at positions which would not coincide with the position of opposite electrodes 108 (on the opposite substrate 107—see FIGS. 1A and 1B). The connecting portions 103 branch from each strip and have a width of 30 $\mu$m greater than the transparent electrode gap size (therefore, in this example, the connecting portion had a width of 55 $\mu$m). For the purpose of the above formation, a vacuum deposition method was used to continuously form a chromium film approximately 500 Å thick and a gold film approximately 1000 Å thick, and thereafter a photolithographic method was used to pattern the films. Chromium was etched with ammonium ceric nitrate, and gold was etched with iodine-potassium iodide.

Subsequently, a color filter 105 was formed in a striped pattern with a color filter element width of 90 μm and a layer thickness of 1.2 μm by selectively coating a color resist comprising a dispersion of R, G and B pigments in an ultraviolet-curing resin, and performing an exposure-development process three times (once for each color). The result was a plurality of columns of color filter elements. During the formation of the color filter 105, the color filter elements were formed in such a manner that adjacent color filter elements overlapped adjacent line elements of the light shielding layer 102. Additionally, a part of the color filter 105 was omitted over one out of every five electrically connecting portions 103 of the light shielding layer 102 in order to define a through-hole 104. For example, referring to FIG. 1A (which for purposes of illustration shows substrate 101 having portions of the structure for three columns, CA, CB, CC, formed thereon, with column CA including light shield 102 and color filter elements 105a, 105b, 105, column CB including only light shield 102, and column CC including only color filter elements 105a, 105b, 105c), each light shielding strip 102 includes a plurality of connecting (and light shielding) portions 103a–103g. A through-hole is formed over every fifth connecting portion (103b and 103g in FIG. 1A). Through-hole 104a is located over connecting portion 103b, while through-hole 104b is located over connecting portion 103g. The remaining portions (103a, 103c, 103d, 103e, 103f) are covered by the color filter and therefore are not ultimately attached to a transparent electrode, but still function as opaque, light shields between adjacent display elements. Each display element is defined at the locations where the opposite electrodes 108 overlap the electrodes 106. The interval at which through-holes 104 are formed, however, is not specifically limited, and through-holes may be formed as frequently or infrequently as is deemed appropriate in accordance with a desired wiring resistance and the production method used. (Although the illustrated through-holes 104 extend entirely across each color filter column, it is also possible for the through-holes 104 to be formed to extend only partially across each column.)

Subsequently, a smoothing layer 113 was selectively formed by imparting an ultraviolet-photosensitivity to an epoxy acrylate resin, coating the resin by a spin coating method so as to have a thickness of 1.2 μm, and irradiating the resultant coating with ultraviolet light. During the ultraviolet radiation, those portions of the resin coating corresponding to the position of the through-holes 104 formed in the color filter were prevented from being irradiated with ultraviolet light, thereby omitting these corresponding parts of the smoothing layer 113. Accordingly, all of the color filter is covered with the smoothing layer 113. Additionally, all of the light shield 102, except for those portions located at a through-hole 104 is covered by the smoothing layer 113.

Figure 2:
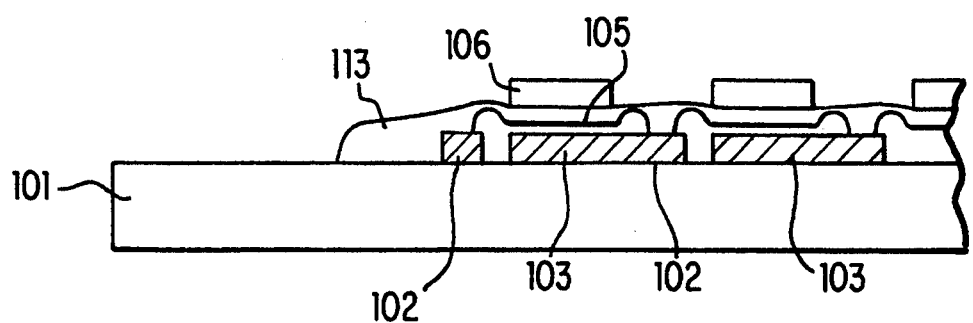
FIG. 2 is a fragmentary sectional view of the substrate shown in FIG. 1, taken along line 2—2 shown in FIG. 1.
Figure 3:
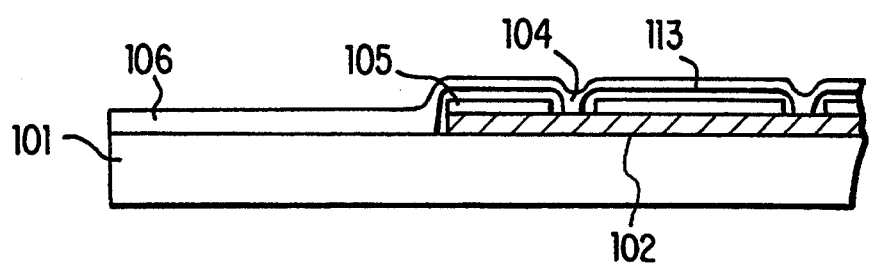
FIG. 3 is a fragmentary sectional view of the substrate shown in FIG. 1, taken along line 3—3 shown in FIG. 1.

Finally, transparent display electrodes 106 were formed above the color filter 105 (and smoothing layer 113) by forming a 1000 Å thick transparent electrically-conductive film of ITO on the smoothing layer 113 by a magnetron sputtering method at a film forming temperature of 180° C., and performing a photolithographic method. During this formation, some of the film material enters the through-holes 104 to establish electrical connection with the connecting portions 103 of the light shielding layer 102 located at the through-holes 104. FIG. 2 shows the structure in a section taken along line 2—2, shown in FIG. 1, and FIG. 3 shows the structure in a section taken along line 3—3 shown in FIG. 1.

Figure 4:
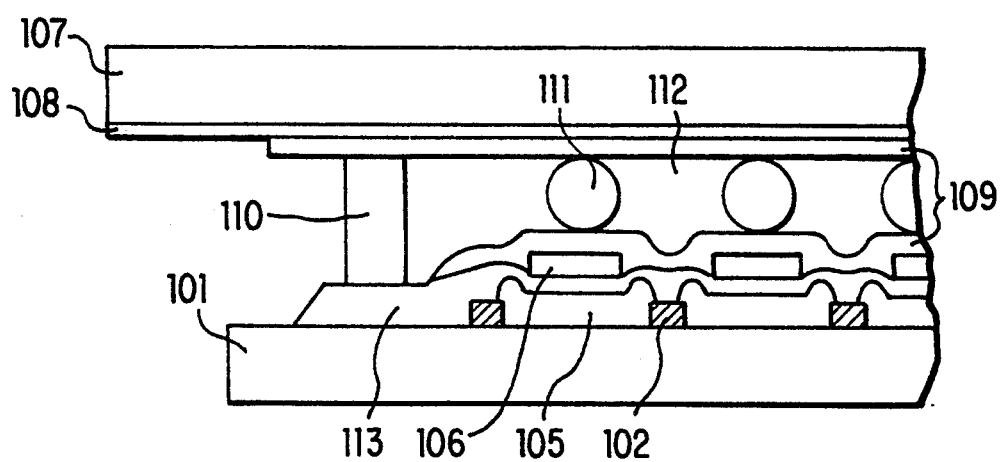
FIG. 4 is a fragmentary sectional view of an electro-optical apparatus incorporating the substrate illustrated in FIG. 1.

Referring to FIG. 4, the construction of an electro-optical apparatus according to the present invention will be described. The opposite glass substrate 107 of the same type as the glass substrate 101 illustrated in FIG. 1 was prepared, and opposite electrodes 108 of ITO were formed on the glass substrate 107 in a series of rows. Subsequently, alignment coatings 109 were formed having a thickness of 300 to 400 Å by using polyimide. The substrates 101 and 107 were fixed together by a seal member 110, and a liquid crystal material 112 was sealed in the gap between the substrates 101 and 107. Spacer elements 111 were spread throughout the liquid crystal material 112 to maintain a predetermined space between substrates 101 and 107.

In this embodiment, when the resistance of the display structure including the substrate and the transparent display electrodes 106 was evaluated, a resistance of 4 kΩ was exhibited at each-color portion. Another electro-optical apparatus was produced, and this apparatus was exactly the same as the first apparatus except that the second apparatus had no light shielding layer, had transparent-electrodes formed above the color filter by a low-temperature magnetron sputtering method (with a thickness of 2000 Å and a surface resistivity of 20Ω/□), and had a smoothing layer. The display structure of this comparative display had a wiring resistance of 25 kΩ. When the display performances of the first and second apparatus were compared, the electro-optical apparatus produced by a method according to the present invention was able to achieve high quality free from cross-talk. Additionally, when the electro-optical apparatus produced in accordance with the first embodiment of the invention was subjected to 60° C.–90% RH (relative humidity) constant-temperature constant-humidity shelf tests, no change occurred for 300 hours. When that apparatus was subjected to 50° C.–90% RH constant-temperature constant-humidity conduction tests, no electric corrosion or change in image quality was observed, and thus, the apparatus exhibited good stability.

Although in the first embodiment, the smoothing layer 113 is formed to extend to below the seal 110, the results discussed above are obtainable regardless of whether the smoothing layer 113 extends outward beyond seal 110, or stops within the area defined by seal 110.

Although the present invention has been described with respect to one embodiment, the present invention is not intended to be limited thereto. For example, other color filter forming methods such as an electrodeposition method, a method in which pigments are dispersed in printing ink and the color filter is formed by an offset printing method or the like, or a method in which pigments are dispersed in a substrate such as polyimide resin and the color filter is patterned by using a photoresist may be used. Also, the smoothing layer may be formed by using another material such as, e.g., a thermosetting melamine resin, an epoxy resin or a silicon-type resin, and/or another forming method.

In accordance with another embodiment of the invention, a display structure was obtained in a similar manner as in the first embodiment except that a light shielding layer 102 of a similar thickness was formed on a substrate by using nickel and gold. Then, another substrate and similar opposite electrodes were used, glass bead spacer elements having substantially the same particle size were used to set a cell gap size of 2 $\mu$m, and a ferroelectric liquid crystal material was sealed between the substrates. When the display was checked by varying the pulse width in the reset-driving frequency, response was made in a good waveform-saturated condition up to a pulse width of approximately 60 $\mu$s and a reset-driving frequency of approximately 20 Hz. In contrast with the electro-optical apparatus according to the second embodiment as described above, an electro-optical apparatus having a conventional construction, in which no metal light shielding layer was formed, exhibited a pulse width of approximately 250 $\mu$m and a reset-driving frequency of 8 HZ, and provided displays suffering from noticeable flicker. Thus, it was possible to produce a ferroelectric crystal display capable of performing an excellent color display.

Figure 5:
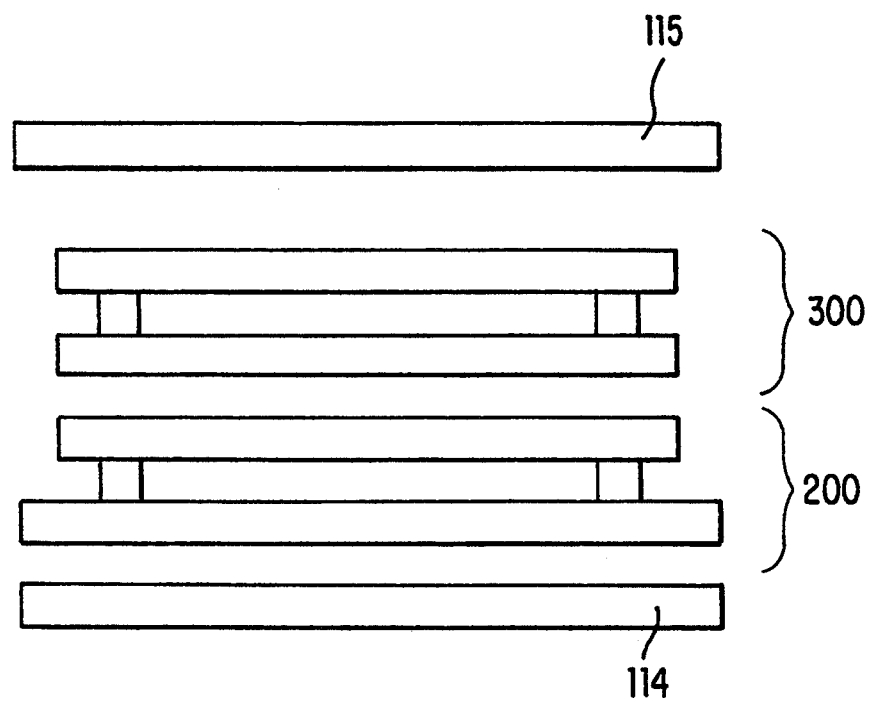
FIG. 5 is a view showing the construction of an electro-optical apparatus in accordance with another embodiment of the present invention.

The construction of a third embodiment of an electro-optical apparatus according to the present invention will be described with reference to FIG. 5. An electro-optical apparatus of the same type as that described in FIG. 1 was used as a display cell 200 in which optical switching could take place. In this embodiment, an optically anisotropic body 300 having the same birefringence (indicated by the product ($\Delta n \times d$) of the cell gap size (d) and the refractive index anisotropy $\Delta n$ of the liquid crystal material) as display cell 200 was disposed between a pair of polarizers 114 and 115 along with display cell 200. The optically anisotropic body 300 was, for example, a liquid crystal cell capable of optical compensating for the display cell 200. In this embodiment, the liquid crystal display cell 200 had a birefringence ($\Delta n \times d$) of 0.9, where $\Delta n = 0.129$ and the liquid crystal cell 300 also satisfied the equation of $\Delta n \times d = 0.9$, where $d = 8$ $\mu$m and $\Delta n = 0.113$. Cell 300 optically compensates the eliptically polarized light transmitted from display cell 200. In this construction, the respective directions of alignment on adjacent surfaces of the display cell 200 and the liquid crystal cell 300 form a first angle which preferably ranges from 90° to 100°, and more preferably equals 90°. In this third embodiment, the first angle was 90. A second angle, formed by the directions of alignment on the mutually adjacent surfaces of the display cell 200 and the liquid crystal cell 300 with respect to the axis of polarization of the polarizers 114 and 115 ranges from 20° to 50°. With the birefringence and the variance of the refractive index used in this embodiment, the second angle is 45°. This permits black to be shown during a non-lit period and white to be shown during a completely-lit period. However, as is known, making the angle between the directions of alignment and the axis of polarization clockwise versus counterclockwise as viewed on the electro-optical apparatus causes the angular difference to be positive or negative. In this embodiment, the second angle was negative.

As long as an optical anisotropic body has the same birefringence as the display cell 200, the optical anisotropic body is able to provide similar effects. For instance, an oriented polymer film of polyvinyl alcohol, polycarbonate or the like may be used instead of a liquid crystal material as cell 300. Thus, the type of optically anisotropic body is not specifically limited. When the thus produced electro-optical apparatus was used to effect display, and image quality was evaluated, it was possible to obtain color display of high image-quality having good black-and-white color rendition.

In contrast with the constructions described above, the construction shown in FIG. 6 is adapted to provide for the possibility that forthcoming signal input methods may necessitate high densities as the display information content continues to increase. Thus, the construction shown in FIG. 6 is rendered capable of coping with a method such as the following: a method for increasing density by attaching to a glass substrate a flexible tape on which a driver is mounted with an anisotropic electrically-conductive adhesive interposed therebetween; a method in which a metal layer of aluminum, gold or the like is formed on signal input terminal portions of one of the substrates, and is connected to a driver-mounted substrate by a wire bonding technique; or a method in which a driver is directly mounted on a glass substrate (a method generally referred to as "COG" (chip on glass)).

Figure 6:
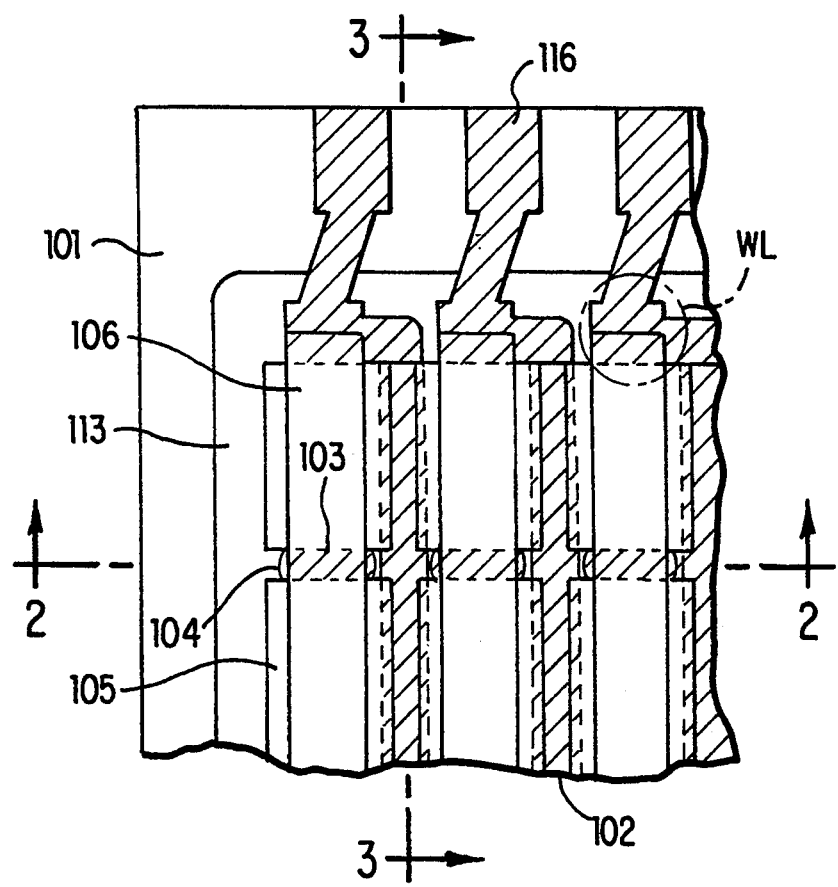
FIG. 6 is a fragmentary plan view of a substrate having a color filter in accordance with a further embodiment of the present invention.

In the FIG. 6 embodiment, a light shielding layer 102 of the same type as that illustrated earlier is extended to the outside of the display area. Portions of the light shielding layer 102 were connected to ordinary signal input terminal portions and to the transparent electrode 106 at locations where the color filter 105 is absent, and connected to the transparent display electrodes 106 at wiring locations between display portions (see the circled region WL in FIG. 6). Wiring portions (for attachment to the transparent electrode 106) and signal input terminal portions 116 were formed by using the thus formed light shielding layer 102. When wire bonding was performed by using gold wire on the signal-input terminal portions 116, it was possible to confirm a good eutectic-bonding condition. When COG mounting was performed, and the resultant substrate was subjected to 60° C.–90% RH constant-temperature constant-humidity shelf tests after performing molding for obtaining an ordinary electro-optical apparatus, the input to the driver and the output of the substrate side were observed, and achieved good results and no problem occurred for 250 hours. The type of metal used in the above construction may be selected in accordance with the mounting method used.

As has been described above, with the arrangement of the present invention in which a light shielding layer and an electrical conductor are formed by using a metal layer, and in which the metal layer is electrically connected with transparent display electrodes via through-holes, it is possible to greatly reduce wiring resistance, and thus, to obtain a high-quality electro-optical apparatus free from the risks of cross-talk and contrast reduction. Further, it is possible to use a simple process to form electro-optical apparatus having high duty ratios, thereby enabling inexpensive electro-optical apparatus to be provided with high yield. Additionally, when the light shielding layer is formed extending to signal-input terminal portions, it may be used with various mounting methods such as COG and wire bonding.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. An electrode arrangement for use in a liquid crystal display apparatus comprising:
 a transparent substrate;
 a color filter disposed on a surface of said transparent substrate, said color filter including a plurality of columns of color filter elements, each column spaced from an adjacent column;
 a light shielding layer disposed on said surface of said transparent substrate, said light shielding layer including a plurality of columns of an opaque, electrically conductive shielding material located between each of said columns of color filter elements;
 a smoothing layer disposed over at least said color filter elements and said light shielding layer;
 a plurality of columns of transparent display electrodes disposed on said smoothing layer above a corresponding one of said columns of color filter elements, each of said columns of transparent display electrodes electrically connected with a corresponding column of said light shielding layer;
 said transparent display electrode columns extending to an edge of said transparent substrate to form terminals for electrical attachment to external devices, ends of said light shielding layer columns located at a portion of said transparent substrate spaced from said edge so that the ends of said light shielding layer columns are located radially inward from said terminals.

2. The arrangement according to claim 1, wherein each column of color filter elements includes a plurality of said color filter elements.

3. The arrangement according to claim 1, wherein adjacent columns of said color filter elements have different colors.

4. The arrangement according to claim 1, wherein said smoothing layer comprises a layer selected from the group consisting essentially of: at least one inorganic layer, at least one organic layer, and a laminate of at least one inorganic layer and at least one organic layer.

5. The arrangement according to claim 1, wherein said shielding material is metal.

6. The arrangement according to claim 5, wherein said metal is a selected from the group consisting of: a laminate of aluminum and chromium-gold, a laminate of nickel-gold, nickel, tantalum, and copper.

7. The arrangement according to claim 1, wherein each of said columns of color filter elements includes at least one through-hole which extends from an adjacent one of said columns of light shielding material through a portion of said column of color filter elements and through the smoothing layer located over said portion, said adjacent one of said columns of light shielding material being electrically connected with said transparent display electrode column located over said column of color filter elements via said at least one through-hole.

8. The arrangement according to claim 7, wherein there are a plurality of said through-holes in each column of color filter elements.

9. The arrangement according to claim 7, wherein each column of said light shielding layer includes a connecting portion which extends into said at least one through-hole of the adjacent color filter element column and is electrically coupled to said transparent display electrode.

10. An electro-optical apparatus comprising:
 first and second transparent substrates attached to each other by a sealing member which defines a sealed area between said first and second substrates;
 a liquid crystal material located in said sealed area; and
 a matrix of color display elements within said sealed area, each color display element spaced from an adjacent color display element and including:
  a color filter element located on said first transparent substrate;
  a strip of opaque, electrically conductive shielding material located directly on said first transparent substrate adjacent to and in contact with said color filter element;
  a smoothing layer disposed over at least said color filter element and at least a portion of said strip of light shielding material;
  a transparent display electrode disposed on said smoothing layer above said color filter element, said transparent display electrode electrically connected with said light shielding strip via a through-hole which extends from said strip of light shielding material, along a side of said color filter element, and through said smoothing layer; and
  an opposite electrode located on said second transparent substrate and positioned over said transparent display electrode;
 each of said transparent display electrodes extending to an edge of said first transparent substrate to form a terminal for electrical attachment to external devices, ends of each of said light shielding strips located at portions of said first transparent substrate spaced from said edge so that the ends of said light shielding strips are located radially inward from each of said terminals.

11. The electro-optical apparatus according to claim 10, wherein the strips of light shielding material for a plurality of said color display elements located in a common column are portions of a single column of said light shielding material, said single column extending in a first direction, said single column contacting the color filter elements of color display elements adjacent to said column in a second direction perpendicular to said first direction, but electrically isolated from the transparent display electrodes of said adjacent color display elements.

12. The electro-optical apparatus according to claim 10, wherein said smoothing layer comprises a layer selected from the group consisting essentially of: at least one inorganic layer, at least one organic layer, and a laminate of at least one inorganic layer and at least one organic layer.

13. The electro-optical apparatus according to claim 10, wherein said light shielding material is metal.

14. The electro-optical apparatus according to claim 13, wherein said metal is a selected from the group consisting of: a laminate of aluminum and chromium-gold, a laminate of nickel-gold, nickel, tantalum, and copper.

15. The electro-optical apparatus according to claim 10, wherein each color filter element is formed only at locations where said transparent display electrode overlaps said opposite electrode.

16. The electro-optical apparatus according to claim 10, wherein said liquid crystal material is a nematic liquid crystal material having a twist angle of not less than 90° and not more than 360°.

17. The electro-optical apparatus according to claim 16, further comprising a pair of polarizers, a display unit including said matrix of color display elements, and at least one layer of an optically anisotropic material, said display unit and said optically anisotropic material being disposed between said pair of polarizers.

18. The electro-optical apparatus according to claim 10, wherein said liquid crystal material is a ferroelectric liquid crystal material.

19. The electro-optical apparatus according to claim 10, wherein each strip of electrically conductive shielding material includes a connecting portion which extends from said strip into said through-hole and is electrically coupled to said transparent display electrode.

20. The electro-optical apparatus according to claim 10, wherein said ends of said light shielding strips are located radially inward from a radially outermost portion of said sealing member.

21. An electro-optical apparatus comprising:
first and second transparent substrates cooperating with a sealing member to hold a liquid crystal material in a gap defined by said sealing member between inner surfaces of said transparent substrates;
a color filter located on the inner surface of at least one of said transparent substrates and including a plurality of color filter elements;
a smoothing layer located on said color filter, said smoothing layer comprising a material selected from the group consisting essentially of: at least one inorganic layer, at least one organic layer, and a laminate of at least one inorganic layer and at least one organic layer;
transparent display electrodes disposed above said color filter; and
a light shielding metal layer, located directly on said inner surface of said first transparent substrate between said color filter elements, which serves as a light shield and as an electrical conductor, said light shielding metal layer electrically connected with said transparent display electrodes on said first transparent substrate via through-holes located in said color filter and said smoothing layer;
said transparent display electrodes on said first transparent substrate extending to an edge of said first transparent substrate to form terminals for electrical attachment to external devices, ends of said light shielding layer located at a portion of said first transparent substrate speed from said edge so that the ends of said light shielding layer are located radially inward from said terminals.

22. The electro-optical apparatus according to claim 21, wherein said color filter comprises a plurality of columns of said color filter elements, said metal layer is formed as a plurality of strips between said columns of color filter elements, and said transparent display electrodes are formed as a plurality of strips above corresponding ones of said color filter element columns.

23. The electro-optical apparatus according to claim 21, wherein said color filter elements are selectively formed only at locations where said transparent display electrodes overlap opposite electrodes located on the inner surface of the second transparent substrate to form display elements, said light shielding metal layer comprising strips of said metal material formed on said first substrate at positions which do not correspond to said display elements, adjacent strips of said metal material being electrically isolated from each other and having connecting portions partially extended into said through-holes and attached to a corresponding transparent display electrode.

24. The electro-optical apparatus according to claim 21, wherein said liquid crystal material is a nematic liquid crystal material having a twist angle of not less than 90° and not more than 360°.

25. The electro-optical apparatus according to claim 24, further comprising a pair of polarizers, a display unit including said pair of transparent substrates, and at least one layer of an optically anisotropic material, said display unit and said optically anisotropic material being disposed between said pair of polarizers.

26. The electro-optical apparatus according to claim 21, wherein said liquid crystal material is a ferroelectric liquid crystal material.

27. The electro-optical apparatus according to claim 21, wherein said metal material is selected from the group consisting of: a laminate of aluminum and chromium-gold, a laminate of nickel-gold, nickel, tantalum, and copper.

28. The electro-optical apparatus according to claim 21, wherein said ends of said light shielding layer are located radially inward from a radially outermost portion of said sealing member.

* * * * *